United States Patent
Hanson et al.

(10) Patent No.: US 6,253,146 B1
(45) Date of Patent: Jun. 26, 2001

(54) NETWORK-BASED TRAFFIC CONGESTION NOTIFICATION SERVICE

(75) Inventors: Karrie Jo Hanson, Westfield; Howard Paul Katseff, Englishtown; Robert Edward Markowitz, Glen Rock; Bethany Scott Robinson, Lebanon, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/455,243

(22) Filed: Dec. 6, 1999

(51) Int. Cl.$^7$ ........................................... G06G 7/78
(52) U.S. Cl. ................. 701/202; 701/204; 701/117; 701/118; 340/905; 340/990; 340/995
(58) Field of Search ............................. 701/202, 204, 701/211, 208, 117, 118, 119; 340/988, 995, 990, 905; 455/409, 412

(56) References Cited

U.S. PATENT DOCUMENTS

| | | | |
|---|---|---|---|
| 5,438,687 | 8/1995 | Suchowerskyj et al. | 455/158.4 |
| 5,523,950 | 6/1996 | Peterson | 364/436 |
| 5,610,821 | 3/1997 | Gazis et al. | 364/444.2 |
| 5,648,769 | 7/1997 | Sato et al. | 340/988 |
| 5,745,865 | 4/1998 | Rostoker et al. | 701/117 |
| 5,818,356 | 10/1998 | Schuessler | 340/995 |
| 5,831,552 | 11/1998 | Sogawa et al. | 340/995 |
| 5,862,244 | 1/1999 | Kleiner et al. | 382/104 |

*Primary Examiner*—William A. Cuchlinski, Jr.
*Assistant Examiner*—Yonel Beaulieu

(57) ABSTRACT

A server platform in the PSTN performs the service of calling the subscriber if the subscriber's customary commuting route is congested. The service makes an initial call when the fastest commute route is congested. It also makes additional calls each time it finds a better alternate route. The server can accommodate any subscriber commuting pattern. If a street on the subscriber's customary route is found to be congested, then the server sequentially tests additional streets having geographic coordinates nearby, dynamically searching for an alternate route that has an acceptable level of congestion. The server has a voice response unit (VRU) in the platform, to announce to the subscriber that the subscriber's customary commuting route is congested. Following an initial call to the subscriber, the server continues to search for better alternate routes having the least congestion and it calls the subscriber again if it finds a better alternate route.

19 Claims, 2 Drawing Sheets

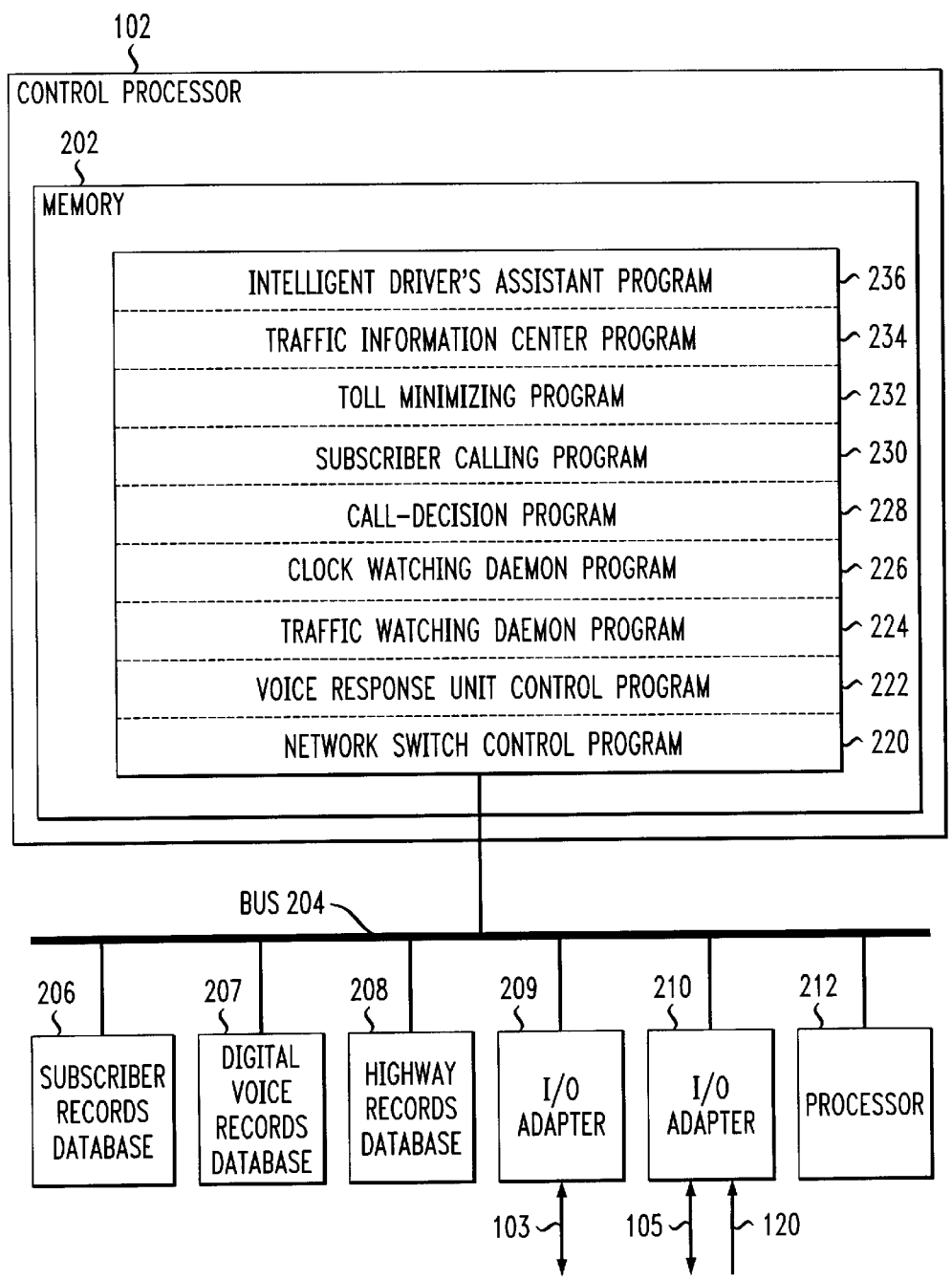

NETWORK-BASED TRAFFIC CONGESTION NOTIFICATION SERVICE

RELATED PATENTS

This patent application is related to the issued U.S. Pat. No. 5,732,383 entitled "Traffic Information Estimation and Reporting System", by Mark J. Foladare, et al., assigned to AT&T Corp. and incorporated herein by reference.

This patent application is also related to the issued U.S. Pat. No. 5,528,501, entitled "System and Method for Supplying Travel Directions", by Bruce Hanson, assigned to AT&T Corp. and incorporated herein by reference.

This patent application is also related to the issued U.S. Pat. No. 5,479,482, entitled "Cellular Terminal For Providing Public Emergency Call Location Information", by Gary J Grimes, assigned to AT&T Corp. and incorporated herein by reference.

BACKGROUND OF THE INVENTION

Traffic congestion continues to increase in metropolitan areas. If a driver could be notified when his intended route has unusual congestion then he might be able to find an alternate route that would get him to his destination faster and with less aggravation. Currently, drivers have access to traffic reports periodically provided on broadcast radio stations. These reports contain traffic information for a wide geographic area, requiring the driver to listen carefully for information pertinent to his trip. It is often difficult to assess the information and find a better alternate route while driving. Further, the reports may not be available when needed because of their periodic nature. Some localities have Highway Advisory Radio which continually broadcasts current traffic conditions and others have variable signs on the highways which provide notification of unusual conditions. While these services provide information more frequently, it is still not in a form that can easily be used to determine alternate routes.

SUMMARY OF THE INVENTION

A server platform in the PSTN performs the service of calling the subscriber if the subscriber's customary commuting route is congested. The service makes an initial call when the fastest commute route is congested. It also makes additional calls each time it finds a better alternate route or if the alternate route becomes congested.

The server has a first database of subscriber records organized by the subscriber's customary start time of each commute. The server can accommodate any subscriber commuting pattern. For example, a particular subscriber can have a morning time for a commute to work, an "evening rush-hour" time for a commute from work to night school, and a "night time" commute from night school to home. Each record in the database includes the sequence of street names and the geographic coordinates of each entry and exit point of the segments of each street of the subscriber's customary commuting routes. Each record will also have the subscriber's home telephone number, work telephone number, and vehicle cellular phone number. In addition, a subscriber record can include commuting routes that are taken on specified days of the week, e.g., a Monday route that may be different from a Tuesday route.

The server has a second database of highway records organized by street name. Each record will include the geographic coordinates of segments of the highway and a corresponding field for storing a congestion metric for that respective segment. If a street on the subscriber's customary route is found to be congested, then the server sequentially tests additional streets having geographic coordinates nearby, dynamically searching for an alternate route that has an acceptable level of congestion. In an alternate embodiment, each street segment in the record can also have a corresponding "trial alternate route" field. The trial alternate route is the first alternate route to be tested for congestion by the server when a street that is part of the subscriber's customary commuting route is found to be congested. If the trial alternate route is also found to be congested, then the server sequentially tests additional streets having geographic coordinates nearby, dynamically searching for an alternate route that has an acceptable level of congestion.

The server has a third database of digital voice records for a voice response unit (VRU) in the platform, that have pre-recorded street names, standard descriptions of congestion conditions, and stock phrases needed to announce to the subscriber that the subscriber's customary commuting route is congested. Following an initial call to the subscriber, the server continues to search for better alternate routes having the least congestion and it calls the subscriber again if it finds a better alternate route. Alternately, the server can use text-to-speech (TTS) to avoid pre-recording a prohibitive number of street names.

The server includes a data processor programmed to perform the following sub-functions:

[a] Run a traffic watching daemon that collects congestion measurements for respective segments of highways in the region and stores in each highway record of the second database, a congestion metric for the geographic coordinates of each segment of the respective highway.

[b] Run a clock watching daemon that searches all subscriber records for matches of the time-of-day with the scheduled commuting times in the respective record, and selects those subscriber records having a current match.

[c] Run a call-decision process that analyzes each selected subscriber record identified by the clock watching daemon. Each street name in the subscriber record for the scheduled commute, is used as a search term for the second database of highway records. The geographic coordinates of each entry and exit point of each segment of each street of the subscriber's customary route are used as a search term to access the congestion metric for that respective segment. Each congestion metric value is compared to a threshold value. If any street segment congestion metric exceeds the threshold value, then the server sequentially tests additional streets having geographic coordinates nearby, dynamically searching for an alternate route that has an acceptable level of congestion. The threshold may be user definable, since some subscribers may be willing to tolerate higher levels of congestion than others. For example, different levels of thresholds can be selected from severe, to moderate, to light.

[d] Run a subscriber calling process that responds to a detected traffic congestion condition by accessing the first database of subscriber records to obtain the subscriber's telephone number. The process outputs the telephone number to the VRU. The process forms query terms to apply to the third, VRU database. Recorded phrases are concatenated by the VRU to announce to the subscriber the street segment having the congestion. Also, the VRU announces the alternate route which has been found for the congested street segment. Following an initial call to the subscriber, the server continues to search for better alternate routes having the least congestion and it calls the subscriber again if it finds a better alternate route.

The subscriber calling process accurately describes to the driver why it is suggesting a new route.

An algorithm is used to advise the subscriber of routes that avoid or minimize tolls according to the subscriber's preference. The server has stored the subscriber's specification of the way the subscriber usually chooses his routes to avoid or accept tolls. The algorithm simulates the subscriber's choices of routes according to this specification. The algorithm equates the number of minutes required to detour a toll route, with the value in dollars of that lost time to the subscriber.

The subscriber has the option to specify what it means to be a better alternate route. For example, in addition to toll avoidance, the subscriber can specify a preference for highway driving or local roads, for the most scenic routes, for the fastest routes, for the shortest distance routes, or for routes that goes by certain features, such as a grocery store, and the like.

DESCRIPTION OF THE FIGURES

FIG. 2 is a functional block diagram of the control processor in the platform server.

DISCUSSION OF THE PREFERRED EMBODIMENT

OVERVIEW OF THE INVENTION

Figure 1:
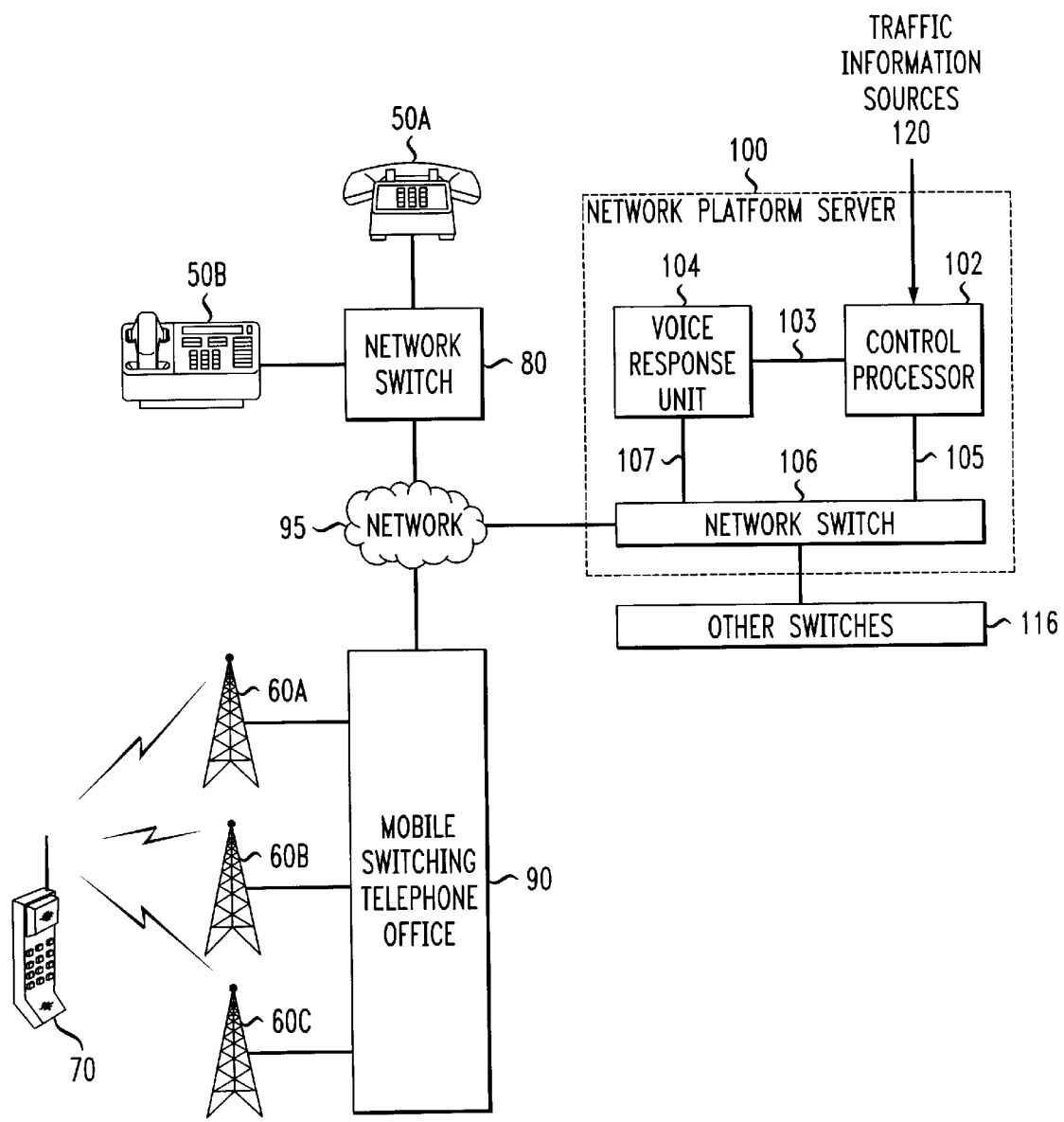
FIG. 1 is a network diagram, showing the platform server that provides the network-based traffic congestion notification service, in accordance with the invention.

The network diagram of FIG. 1 shows the network platform server 100 connected through the public switched telephone network (PSTN) 95 to the network switch 80 that serves the subscriber's home phone 50A and the subscriber's office phone 50B. The network platform server 100 is also connected through the PSTN network 95 to the mobile telephone switching office 90 which controls the base stations 60A, 60B, and 60C. The base stations 60A, 60B, and 60C are all in the same geographic region and are in radio frequency communication with the subscriber's mobile phone 70. The network platform server 100 includes the control processor 102, the voice response unit (VRU) 104, and the network switch 106. The network platform server 100 can be connected to other switches 116 in the network. The server platform 100 in the PSTN network 95 performs a service of calling the subscriber if the subscriber's customary commuting route is congested. The service makes an initial call when the preferred commute route is congested. It also makes additional calls each time it finds a better alternate route.

In the preferred embodiment of the invention, the network platform server 100 has the system's intelligence located at the platform and requires merely an ordinary cellular phone in the subscriber's car. The network platform server 100 makes use of vehicle tracking systems that cellular carriers have available to meet FCC requirements for locating vehicles making 911 calls. Either sometime before the beginning of a trip or during a trip, the cellular phone subscriber calls the voice response unit (VRU) 104 in the network platform server 100. The control processor 102 in the network platform server 100 is programmed with a Traffic Information Center (TIC) program 234 of FIG. 2, which continually receives, coordinates, and stores traffic information from sources 120 such as municipal traffic monitoring centers, commercial traffic reporting services, and the like.

In the preferred embodiment, the control processor 102 in the network platform server 100, is programmed with the Intelligent Driver's Assistant program 236 of FIG. 2, to enable subscribers to specify the beginning and end locations for a trip. Subscribers can store their commonly traveled commuting routes in the network platform server 100 using the Intelligent Driver's Assistant program 236. Subscribers can schedule this service from a land line telephone or their vehicle's cellular phone via the voice response unit (VRU) 104 or they can connect to the server 100 over the Internet. The network platform server 100 checks whether the subscriber's normal route has any congestion. Subscribers can register trips that they make at the same time each day. Immediately before the usual time that the subscriber makes a commuting trip, for example, the network platform server 100 updates the traffic information and checks for traffic congestion. If there are traffic problems, the network platform server 100 calls the subscriber's home or office before they start their trip. If there is congestion, the network platform server 100 searches for better alternate routes and informs the subscriber if it has found any. While the subscriber is on the road, the network platform server 100 can call the subscriber on their cellular phone when it detects changes in traffic congestion on their route.

Obtaining Current Traffic Conditions

A variety of methods are currently used to collect traffic conditions. They include:
  reporters in traffic helicopters, vehicles and skyscrapers,
  speed sensors or vehicle detectors in roadways, and
  measurement of car speed using transponders in cars (such as EzPass).

The speed sensors and transponder tracking systems provide continuous, real-time, traffic information but are expensive to install, monitor, and maintain. Traffic reporters are cost-effective, but only provide spotty coverage of traffic conditions.

The invention provides a better way to alert the subscriber about traffic conditions, which improves on existing methods. For the centralized network platform server 100, the Traffic Information Center (TIC) program 234 tracks the movements of the vehicles to determine traffic conditions. Cryptographic techniques can be used to provide anonymity for the drivers.

The Traffic Information Center

The Traffic Information Center (TIC) program 234 in the network platform server 100, obtains traffic information from a variety of sources as described above, parses each incident, encodes it in a standard format, and stores it. Traffic information can be limited to major highways or it can be provided for secondary streets and roads. Each highway is divided into small segments, usually by exit or other well known landmark. The information consists of multiple records, each containing a highway (or bridge or tunnel), the name of a segment of the highway, usually the landmark or exit number of the end of the segment, the direction of travel and an integer indicating the number of minutes of delay: the difference between the expected travel time and the normal travel time.

It is further necessary to distinguish between different roadways on a highway. For instance, highways may have local and express roadways or truck and car roadways and bridges may have upper and lower levels. These need to be separated because there may be a traffic delay on one roadway while the other is flowing normally. Highways are assigned two directions, such as north and south, or east and west. For ring roads, such as the Washington D.C. Beltway, the directions are referred to as clockwise and counterclockwise. This model fits most roads. One of the few exceptions found is the Triborough Bridge in New York City which can be traversed in three directions.

For highway systems with speed sensors in the roadways it is necessary to use the sensors to define the endpoints of the segments. This works well because the sensors are often placed at overpasses for major highways. However, it is common for the sensors in the two directions of a highway to be placed in different places, requiring the segments to be different for each direction.

An example of the invention obtains traffic information for the New York metropolitan area from a traffic reporting broadcast radio station. These consist of typed descriptions of traffic incidents. An example is shown in Table 1.

Table 1. Typical Traffic Reporting Broadcast Radio Station Report
Headlines
IN MANHATTAN . . . **** THE SOUTHBOUND FDR DRIVE SLOWS INTO THE 70'S DUE TO AN ACCIDENT BLOCKING THE LEFT AND CENTER LANES, NORTHBOUND TRAFFIC SLOWS THROUGH THE AREA WITH RUBBERNECKING.
River Crossings
AT THE HUDSON RIVER CROSSINGS . . . ****THE INBOUND GW BRIDGE HAS ABOUT 5–10 MINUTES ON THE LOWER DECK, THEN A MINOR WAIT ON THE UPPER DECK. THE LINCOLN AND HOLLAND TUNNELS HAVE 20–25 MINUTES.
CROSSING THE EAST RIVER . . . ** THE MANHATTAN BOUND 59TH STREET BRIDGE SLOWS ACROSS BOTH DECKS. THE QUEENS MIDTOWN TUNNEL STILL HAS LIGHT DELAYS EACH WAY.
AT THE UPPER EAST RIVER CROSSINGS . . . *** THE BRONX-MANHATTAN BOUND TRIBOROUGH BRIDGE HAS AROUND 5–10 MINTUES. THE WHITESTONE AND THROGS NECK BRIDGES HAVE 5.
AT THE STATEN ISLAND BRIDGE CROSSINGS . . . ** THE VERRAZANO, GOETHALS AND BAYONNE BRIDGES AND OUTERBRIDGE CROSSING HAVE NO REPORTED DELAYS EITHER WAY.
New York City's Five Boroughs
*** ALTERNATE SIDE RULES ARE SUSPENDED TODAY EXCEPT IN A FEW AREAS OF BROOKLYN, QUEENS AND THE BRONX. CHECK THE STREET SIGNS CAREFULLY BEFORE YOU PARK.
IN BROOKLYN . . . **** IN WILLIAMSBURG: AVOID THE INTERSECTION OF MARCY AVENUE AND PENN STREET DUE TO A COLLISION INVOLVING AN OVETURNED POLICE VEHICLE.
** THE INBOUND GOWANUS EXPRESSWAY SLOWS FROM THE BELT PARKWAY TO THE PROSPECT EXPRESSWAY BECAUSE OF ONGOING CONSTRUCTION IN THE RIGHT LANE. THE SOUTHBOUND BQE FROM THE L.I.E. TO THE KOSCUISZKO BRIDGE. FARTHER SOUTH.

One of the problems with using with these reports is their imprecision. Instead of providing the number of minutes of delay, they use an adjective such as "slow," "tied up", or "standstill" to describe the delay. The TIC deals with this by assigning a numeric value to each description. For instance, it assumes that "slow" means a five minute delay. Table 2 shows how the above report is encoded. The first 2 columns in Table 2 indicate delays for truck, local, or upper roadways, and columns 3 and 4 are for car, express, or lower roadways. If the roadway is unspecified, both columns are filled in. Columns 1 and 3 are for northbound or eastbound roadways and 2 and 4 are for southbound or westbound roadways.

Table 2. Encoded Version of Report
TRUCK CAR
LOCAL XPRES
UPPER LOWER
NE SW NE SW
-- -- --
20 0 20 0 HOLLAND TUNNEL
20 0 20 0 LINCOLN TUNNEL
4 0 5 0 GWB
5 5 5 5 FDR DRIVE—70
5 5 0 5 QUEENS MIDTOWN TUNNEL
5 0 5 0 TRIBOROUGH BRIDGE
0 5 0 5 59TH STREETBRIDGE
5 0 5 0 THROGS NECK BRIDGE
5 0 5 0 WHITESTONE BRIDGE
0 10 0 10 BROOKLYN BRIDGE
0 5 0 5 BQE—LIE
5 0 5 0 GOWANUS EXPRESSWAY—BELT A number of existing systems allow the cellular carrier to track the locations of cellular phones. Representative systems include TruePosition which uses "time difference of arrival (TDOA)" from cellular base stations and are capable of an accuracy of 400 feet. The use of "time difference of arrival (TDOA)" provides the subscriber's location information to the mobile telephone switching office (MTSO) for the purpose of locating the exact geographic location of the subscriber's mobile cellular telephone. This method allows the MTSO to determine the exact location of the subscriber's cellular telephone by using the received mobile signal at three or more base station cell sites in the vicinity of the subscriber's cellular telephone. By precisely timing of the received signal at three or more base station sites connected to the MTSO, the MTSO can determine the exact location of the subscriber's cellular phone in relation to the intended coverage area of each respective cell site. The TDOA measurement of distance by two base stations gives two circles of position, each concentric with its respective base. The intersection of the two circles gives two points. Either the correct one of the two points can be guessed, or else a third base station with a concentric circle will intersect the correct one of the two points. The MTSO includes circuits to compensate for the time delay difference between base station sites of the received mobile signal and it uses those signals to determine the distance of the subscriber's cellular telephone from each site.

The invention disclosed herein can use the "time difference of arrival (TDOA)" principle to enable the MTSO to send to the network platform the subscriber's position information. When a change in the traffic conditions is determined by the network platform in the vicinity of the location of the subscriber's vehicle as reported by the MTSO, the network platform places an outbound call to the subscriber's cellular phone to notify the subscriber of the traffic condition. The network platform announces to the subscriber the street segment having the congestion and the "alternate route" suggested for the congested street segment.

Intelligent Driver's Assistant

The network platform server is programmed to perform the service of the Intelligent Driver's Assistant. The system is designed to be configured via a computer connected to the Internet. From their computer, the subscriber specifies the starting and ending points for a trip and the Intelligent Driver's Assistant service immediately provides traffic information for travel between these two points. At this point, the subscriber has several choices:

If this is a trip that the subscriber makes on a regular basis at fixed times, the subscriber can specify a time interval just before he starts the trip and the phone number for his home or office. The Intelligent Driver's Assistant service will check traffic at this time each day. On days when there is congestion, it places a call to the specified number and uses stored voice to explain where the traffic congestion is and suggest alternate routes.

The subscriber can alternatively specify a time interval to call a cellular telephone in his vehicle. The Intelligent Driver's Assistant assumes that the subscriber starts at a fixed time, and assumes that the driver will follow the suggested route. It estimates the vehicle's location by computing how far in the route the driver should be, given the elapsed and the current traffic conditions. If it detects congestion between this location and the destination, it calls the cellular phone and provides traffic information.

If the subscriber is leaving immediately after inquiring about the route, he can give his cellular phone number have the Intelligent Driver's Assistant service track his route as described above and call him if there is any change in traffic conditions.

For trips that are made on an irregular basis, the subscriber can have the Intelligent Driver's Assistant service remember this route. He can then dial into an Voice response unit (VRU) system and ask about conditions on any of the routes that have been saved. If calling from a cellular phone in his vehicle, he can have the Intelligent Driver's Assistant service track his route as described above and call him if there is any change.

The Voice response unit (VRU) system gives a subscriber a list of choices and makes use of touch-tones to obtain information from the subscriber. Because this relatively slow, its use is limited to the routes that can be inquired about when the subscriber calls into the service. For faster response, a VRU system is used with speech recognition capabilities. This provides access to arbitrary start and end points for each trip.

Toll Roads

Some subscribers prefer to avoid tolls roads when there is a reasonable free alternative. For instance, many drivers prefer the Pulaski Skyway to the New Jersey Turnpike Newark Bay Extension because it saves 85¢ and adds only two minutes to the drive time. An algorithmic method incorporates subscriber preferences to avoid tolls in fastest route calculations.

The network platform server asks the subscriber how many minutes they would drive to avoid a dollar in tolls. When computing the fastest route, the toll minimizing algorithm multiplies the number of minutes specified by the subscriber by the toll and adds this to the driving time. In experimental trails, 5 minutes per dollar has been found to describe the typical preference of many subscribers.

DETAILED DESCRIPTION OF THE INVENTION

The server platform 100 in the PSTN network 95 performs a service of calling the subscriber if the subscriber's customary commuting route is congested. The service makes an initial call when the fastest commute route is congested. It also makes additional calls each time it finds a better alternate route. As shown in the example traffic messages, several calls may be made.

The control processor 102 in the network platform server 100, is shown in FIG. 2. The control processor 102 includes the memory 202 which is connected by means of the bus 204 to the subscriber records database 206, the digital voice records database 207, and the highway records database 208. Also connected to the bus 204 is the I/O adapter 209 connected over line 103 to the voice response unit 104 and the I/O adapter 210 connected over line 105 to the network switch 106. The I/O adapter 210 is also connected over line 120 to traffic information sources such as municipal traffic monitoring centers, commercial traffic reporting services, and the like. Also connected to the bus 204 is the processor 212, which executes programmable instructions in the memory 202 to carry out some of the functions of the invention.

The memory 202 stores the network switch control program 220, the voice response unit control program 222, the traffic watching daemon program 224, the clock watching daemon control program 226, the call-decision program 228, the subscriber calling program 230, and the toll minimizing program 232. The memory 202 stores the Traffic Information Center (TIC) program 234, which continually receives, coordinates, and stores traffic information from sources 120 such as municipal traffic monitoring centers, commercial traffic reporting services, and the like. The memory 202 stores the Intelligent Driver's Assistant program 236, to enable subscribers to specify the beginning and end locations for a trip. Subscribers can store their commonly traveled commuting routes in the network platform server 100 using the Intelligent Driver's Assistant program 236. Each program is a sequence of program instructions which, when executed by the processor 212, carries out a function of the invention.

The server 100 has a first database 206 of subscriber records organized by scheduled customary time for the commute. Each record will include the sequence of street names and the geographic coordinates of each entry and exit point of the segments of each street of the subscriber's customary routes. Each record will also have the subscriber's home telephone number, work telephone number, and vehicle cellular phone number. The subscriber records can can be generalized to include require only the subscriber's starting location telephone number and the ending location telephone number. This would enable the subscriber to chart a "commute" that isn't from the home to the office, but instead, is from the subscriber's home to the subscriber's beach house.

The server 100 has a second database 208 of highway records organized by street name. Each record will include the geographic coordinates of segments of the highway and a corresponding field for storing a congestion metric for that respective segment. Each street segment in the record can optionally have a corresponding "trial alternate route" field. The trial alternate route is the first route to be tested for congestion by the server when a street that is part of the subscriber's customary commuting route is found to be congested. If the trial alternate route is also found to be congested, then the server sequentially tests additional streets having geographic coordinates nearby, dynamically searching for an alternate route that has an acceptable level of congestion.

The database of highway records contains highways and intersections, sorted in their order on the highway. Note that different roadways of the same road are recorded separately, so that the Parkway local lanes are considered to be a different road that the Parkway express lanes.

The name of the highway (e.g. Interstate 80)

The name of the intersection (may be an exit number or a road name)

The normal travel time on this highway from the previous intersection to this one. This element is meaningless for the first intersection on the highway. This is for a particular direction, say north. We refer to the interval between the two exits as a segment.

The normal travel time in the opposite direction on this segment.

The number of minutes of delay for this segment in each direction. [so the estimated travel time is the sum of the normal time and number of minutes of delay]

The toll for this segment in each direction.

There is also a segment interconnection database, indicating which segments are connected. This is used to compute routes. It contains:

Name of highway, intersection, and direction coming from

Name of highway, intersection, and direction traveling to.

The server 100 has a third database 207 of digital voice records for a voice response unit (VRU) 104 in the platform 100, that have pre-recorded street names, standard descriptions of congestion conditions, and stock phrases needed to announce to the subscriber that the subscriber's customary commuting route is congested.

The server 100 includes a data processor 212 programmed to perform the following sub-functions:

[a] Run a traffic watching daemon 224 that collects congestion measurements for respective segments of highways in the region and stores in each highway record of the second database, a congestion metric for the geographic coordinates of each segment of the respective highway.

[b] Run a clock watching daemon 226 that searches all subscriber records for matches of the time-of-day with the first time and the "evening rush-hour" time in the respective record, and selects those subscriber records having a current match.

[c] Run a call-decision process 228 that analyzes each selected subscriber record identified by the clock watching daemon. Each street name in the subscriber record for the scheduled commute, is used as a search term for the second database of highway records. The geographic coordinates of each entry and exit point of each segment of each street of the subscriber's customary route are used as a search term to access the congestion metric for that respective segment. Each congestion metric value is compared to a threshold value. If any street segment congestion metric exceeds the threshold value, then a congestion flag is posted. If the highway record includes an optional "trial alternate route" field of the street segment that is congested, then it is accessed and tested for congestion by the server. If the trial alternate route is also found to be congested, then the server sequentially tests additional streets having geographic coordinates nearby, dynamically searching for an alternate route that has an acceptable level of congestion.

In the preferred embodiment, the call-decision daemon does not compute actual travel times. Instead, it always makes use of "toll-adjusted travel times" instead of actual travel times. Each time a toll road is encountered in a path, the daemon adds an additional amount of time to the computed travel time to obtain the toll-adjusted travel time. The additional amount is the toll paid on the route multiplied by the value specified by the driver.

[d] Run a subscriber calling process 230 that responds to the posted congested flag by accessing the first database of subscriber records to obtain the subscriber's telephone number. The process outputs the telephone number to the VRU. The process forms query terms to apply to the third, VRU database to access recorded phrases that are concatenated by the VRU to announce to the subscriber the street segment having the congestion and the "alternate route" suggested for the congested street segment. Following an initial call to the subscriber, the server continues to search for better alternate routes having the least congestion and it calls the subscriber again if it finds a better alternate route.

A specific algorithm embodied as the toll minimizing program 232 is used in advising the subscriber of routes that minimize toll road costs. The algorithm equates the number of minutes required to detour, with the value in dollars of that lost time to the subscriber. The toll minimizing algorithm operates as follows.

In a first case, assume that a subscriber has stated a preference to drive an extra 5 minutes for a dollar in tolls and that he is traveling between two locations A and B. Suppose that there are two routes between A and B. Route 1 has a normal travel time of 30 minutes and a toll of $2.00. Route 2 has a normal travel time of 35 minutes and has no toll. The toll adjusted travel time for Route 1 is the 30 minute travel time plus 10 minutes because of the driver's toll preference, giving a total of 40 minutes. The Toll adjusted travel time for Route 2 is 35 minutes. The network platform server 100 will chose Route 2 as the preferred route because it has the lesser toll adjusted travel.

In a second case, suppose that Route 2 has a 10 minute delay due to traffic congestion, making its travel time 45 minutes. In this case, the network platform server 100 will chose Route 1 as the preferred route, because its toll adjusted travel time would be smaller.

The Flow of Messages from the Network Platform Server 100:

The flow refers to:

the saved route: the route previously saved in the daemon's database for this subscriber the fastest route: the route just computed by the daemon as the current fastest route the normal route: the route that would be the fastest route when there are no delays.

%d gets filled in by the appropriate number ("%d" is a decimal integer)

%s gets filled in by the appropriate text ("%s" is a character string)

The flow is:

say("This is the AT&T Traffic Center.")
if (the fastest route is faster than the saved route)
{
　if (the fastest route is the same as the normal route)
　{
　　if (the fastest route has a delay)
　　　say("Congestion on the normal route has improved. It now has a %d minute delay and is the best route for your commute from %s to %s.")
　　else
　　　say("The congestion on the normal route from %s to %s has cleared. It is now the best route for your commute.)"

```
{
else
}
    say("We have found a better route for your commute
        from %s to %s.)
    if (the fastest route has a delay)
        say("The new route has a %d minute delay.");
    else
        say("The new route has no congestion.");
    {
{
else
}
    if(the saved route is the same as the normal route)
    {
        if (the fastest route is the same as the normal route)
            say("We have found traffic congestion on the normal
                route from %s to %s.");
        else
            say("We have found traffic congestion on your cur-
                rent route from %s to %s.");
    }
    loop through the saved route and for each segment with
        congestion
        say("%s has a %d minute delay.");
    if (the fastest route is the same as the saved route)
    {
        say("There is no better route.");
    }
    else
    {
        if (the fastest route is the same as the normal route)
        {
            if (there is a delay on the fastest route)
                say("Congestion on the normal route has
                    improved. It now has a %d minute delay and is
                    the best route for your commute from %s to
                    %s.");
            else
                say("The congestion on the normal route from %s
                    to %s has cleared. It is now the best route for
                    your commute.");
        }
        else
        {
            say("We have found a better route.");
            if (there is a delay on the fastest route)
                say("The new route has a %d minute delay.");
            else
                say("The new route has no congestion.");
        }
    }
}
say("The estimated time for the new route is %d minutes.");
if (the fastest route is faster than the saved route)
    say("It will save %d minutes.")
say ("The route is.");
loop through the segments of the fastest route
{
    if the name of the road is different than the name of the
        road on the previous segment, say the name of the road.
}
```

Example Traffic Messages

The following example messages were generated one morning for a commute to work.

This message is from the AT&T Traffic Center.
We have found traffic congestion on the normal route from Englishtown to Florham Park.
Route 78 westbound local lanes (from Parkway to Route 24) has a 10 minute delay.
Route 24 westbound (from Route 78 to Route 124) has a 10 minute delay.
We have found a better route.
The new route has a 10 minute delay.
The estimated time for this route is 73 minutes.
It will save 9 minutes.
The route is:
Gordons Comer Road to Route 9.
Route 9 northbound.
Route 9 northbound over the Edison Bridge.
Garden State Parkway northbound.
Route 78 eastbound. Make U-turn at Exit 54 to Route 78 westbound.
Route 78 westbound express lanes.
Route 24 westbound, with a 10 minute delay.
Route 24, exit 2A to Florham Park.
We will call you again if there are any changes in this route.
Thank you for using the Intelligent Driver's Assistant.
This message is from the AT&T Traffic Center.
We have found traffic congestion on your current route from Englishtown to Florham Park.
Route 78 westbound express lanes (from Parkway to Route 24) has a 10 minute delay.
Route 24 westbound (from Route 78 to Route 124) has a 10 minute delay.
We have found a better route.
The new route has no congestion.
The estimated time for this route is 76 minutes.
It will save 7 minutes.
The route is:
Gordons Comer Road to Route 9.
Route 9 northbound.
Route 9 northbound over the Edison Bridge.
Route 287 northbound.
Route 24 eastbound.
Route 24, exit 2A to Florham Park.
We will call you again if there are any changes in this route.
Thank you for using the Intelligent Driver's Assistant.
This message is from the AT&T Traffic Center.
We have found a better route for your commute from Englishtown to Florham Park.
The new route has no congestion.
The estimated time for this route is 67 minutes.
It will save 9 minutes.
The route is:
Gordons Comer Road to Route 9.
Route 9 northbound.
Route 9 northbound over the Edison Bridge.
Garden State Parkway northbound.
Route 280 westbound.
Route 80 westbound.
Route 287 southbound.
Route 24 eastbound.
Route 24, exit 2A to Florham Park.
We will call you again if there are any changes in this route.
Thank you for using the Intelligent Driver's Assistant.
This message is from the AT&T Traffic Center.
The congestion on the normal route from Englishtown to Florham Park has cleared. It is now the best route for your commute.
The estimated time for this route is 62 minutes.
It will save 5 minutes.

The route is:
Gordons Comer Road to Route 9.
Route 9 northbound.
Route 9 northbound over the Edison Bridge.
Garden State Parkway northbound.
Route 78 eastbound. Make U-turn at Exit 54 to Route 78 westbound.
Route 78 westbound local lanes.
Route 24 westbound.
Route 24, exit 2A to Florham Park.
We will call you again if there are any changes in this route.
Thank you for using the Intelligent Driver's Assistant.
Second Embodiment of the Invention
In this embodiment:
Instead of a subscriber database, there is a database of registered commute routes. Each record contains the following fields:
The starting point of the trip
The ending point of the trip
[We restrict the starting and ending points to be intersections in the database of highway records. We assume that the driver knows how to get to and from the network of major highways.]
The fastest travel time for this route when there is no congestion.
The telephone number to call. Alternatively could be email address or pager number.
The start time for notification.
How long we should monitor the route.
[The above two elements provide for a time interval, for example, we might call anytime between 6:00 am and 7:00 am. This accounts for variability in people's schedules]
The number of extra minutes to drive for a dollar in tolls.
The path last reported as the best path for the trip. This is a list of highway intersections.
[This is used by the call-decision process below.]
The previously reported travel time for this trip.
[This is used by the call-decision process below.]
The call-decision process [c] works as follows:
Examine the subscriber record selected by the clock watching daemon and compute the fastest route (using the Dijkstra algorithm) and time between the start and end points.
If this differs from the route or time in the subscriber database then it posts the congestion flag.
Additional Features
The subscriber can call the server using a cellular phone while driving, thereby eliminating the need for the subscriber to interact with the service before each commute in order to set up traffic monitoring.
The server can use position estimation to determine the vehicle's current location using the subscriber's starting time and the server's estimates of traffic conditions.
The server can remember routes commonly used by a subscriber when the subscriber calls in to the server to set up traffic monitoring, thereby simplifying the interactions by requiring a choice of among only a few routes the subscriber commonly uses instead of all possible routes.
Alternate Embodiment: Intelligence in the Vehicle
In an alternate embodiment of the invention, the architecture shifts the location of a portion of the system's intelligence to the subscriber's vehicle. In this embodiment, the vehicle has a GPS receiver to determine its current location, a cellular telephone or radio receiver to obtain the traffic information and a mobile computer with a voice response unit for audio output. The mobile computer tracks the vehicle and makes announcements to notify the driver of unusual traffic conditions.

In the alternate embodiment of the invention, the mobile computer in each vehicle has a Highway Database consisting of:
names of road segments and their endpoints,
which other segments are contiguous to this segment,
the normal travel time for each segment, and
the current delay for each segment.

It is necessary to encode roadway intersections with incomplete intersections. For instance, one can exit to Route 1 from the Garden State Parkway southbound, but not from the northbound direction. The database can be further customized for each driver to include their own driving times as a baseline and their preferences to avoid certain roads or road types, such as bridges.

The driver specifies his destination at the beginning of a trip. During the trip, the mobile computer receives real-time updates of segment delay times via a cellular telephone or radio broadcast from the Traffic Information Center (TIC) program 234 in the network platform 100. As described in the U.S. Pat. No. 5,479,482, entitled "Cellular Terminal For Providing Public Emergency Call Location Information", by Gary J Grimes, assigned to AT&T Corp. and incorporated herein by reference, the subscriber's cellular telephone is connected to a GPS device. When the subscriber places a call to the network platform 100, the subscriber's cellular telephone interrogates the GPS device to obtain the geo-coordinates. The cellular telephone then transmits the geo-coordinates to network platform 100. The network platform responds by converting the geo-coordinates into location information of the subscriber's vehicle. The GPS receiver provides real-time updates of the vehicle's location. The software in the vehicle's mobile computer continually computes the least time route from the current location to the specified destination using Dijkstra's Shortest Path Algorithm with the graph derived from the Highway Database (see "Graph Lecture 7—Dijkstra'a Shortest Path Algorithm—Section 9.8", http://www.cs.byu.edu/courses/cs236/javalect/GRAPHS7/Graphs7.html).

Whenever the vehicle's mobile computer detects a change of conditions, it gives an audio description of the congestion to the driver and suggests an alternate route. It can also give turn by turn directions for the alternate route just before arriving at each turn. Safety concerns dictate that the service does not distract the driver. The driver sets the destination before starting the trip and afterward, the interface is audio only.

The vehicle's mobile computer can also provide audio announcements or advertisements with the GPS. For instance, before the subscriber passes the location of an advertiser, e.g., the ShopRite, the vehicle's computer could announce advertisement messages to the subscriber, e.g., about special sales underway. Alternately, the vehicle's mobile computer can be used as a tour guide. For example, while traversing a route through Chicago, the vehicle's computer can announce: " . . . and on your left is the Sears Tower."

Various illustrative examples of the invention have been described in detail. In addition, however, many modifications and changes can be made to these examples without departing from the nature and spirit of the invention.

What is claimed is:

1. A network platform server in a PSTN for calling a subscriber if the subscriber's customary commuting route is congested, comprising:

a storage in the platform, storing subscriber records organized by scheduled commuting time of a subscriber;

highway records stored in the storage, organized by street name;

digital voice records stored in the storage, having pre-recorded street names, standard descriptions of congestion conditions, and stock phrases needed to announce to a subscriber that the subscriber's customary commuting route is congested;

a data processor in the platform, for running a traffic watching process that collects congestion measurements for respective segments of highways in a region and storing in each highway record, a congestion metric for the geographic coordinates of each segment of the respective highway;

said data processor running a clock watching process that searches all subscriber records for matches of the time-of-day with the scheduled commuting time in the respective record, and selecting those subscriber records having a current match;

said data processor running a call-decision process that analyzes each selected subscriber record identified by the clock watching process to determine that the subscriber's customary commuting route is congested;

said data processor sequentially testing alternate routes having geographic coordinates near to the subscriber's customary route, to search for an alternate route that has an acceptable level of congestion;

said data processor running a subscriber calling process that responds to the determination of congestion of the subscriber's customary route, by accessing the subscriber records to obtain the subscriber's telephone number which it outputs to a voice response unit;

whereby recorded phrases are announced by the voice response unit to the subscriber describing the congestion and the alternate route that has an acceptable level of congestion.

2. The network platform server of claim 1, which further comprises:

an algorithm to advise the subscriber of routes that avoid tolls according to the subscriber's preference by storing in the platform the subscriber's specification of the way the subscriber usually chooses his routes to avoid or accept tolls;

the algorithm simulating the subscriber's choices of routes according to the specification;

the algorithm relating a number of minutes required to detour a toll route, with a value in dollars of that lost time to the subscriber.

3. A network server method in the PSTN for performing a service of calling a subscriber if the subscriber's customary commuting route is congested, comprising:

collecting congestion measurements in a network server for respective segments of highways in a region and storing each measurement in a highway record;

searching subscriber records in the network server for matches of the time-of-day with scheduled commuting times in the respective record, and selecting those subscriber records having a current match;

analyzing subscriber records in the network server identified by the searching step, and for a street name in a subscriber record for a scheduled commute, searching highway records for a congestion measurement, comparing it to a threshold value, and sequentially testing additional streets having geographic coordinates nearby, to identify an alternate route that has an acceptable level of congestion; and accessing the subscriber's telephone number and outputting it to a voice response unit to announce to the subscriber the street segment having the congestion and the alternate route which has been found.

4. The network server method of claim 3, which further comprises:

following an initial call to the subscriber, the network server continuing to search for better alternate routes having the least congestion and calling the subscriber again if a better alternate route is found.

5. A network platform server in the PSTN for performing a service of calling a subscriber if the subscriber's customary commuting route is congested, comprising:

a first database of subscriber records organized by customary time for commuting;

a second database of highway records organized by street name;

a third database of digital voice records for a voice response unit (VRU) associated with the platform, that have pre-recorded street names, standard descriptions of congestion conditions, and stock phrases needed to announce to the subscriber that the subscriber's customary commuting route is congested;

a data processor for running a traffic watching daemon that collects congestion measurements for respective segments of highways in the region and stores in each highway record of the second database, a congestion metric for the geographic coordinates of each segment of the respective highway;

said data processor running a clock watching daemon that searches all subscriber records for matches of the time-of-day with a customary commuting time in the respective record, and selects those subscriber records having a current match;

said data processor running a call-decision process that analyzes each selected subscriber record identified by the clock watching daemon, including an algorithm for advising the subscriber of routes that that avoid tolls according to the subscriber's preference;

said data processor running a subscriber calling process that accesses the first database of subscriber records to obtain the subscriber's telephone number which it outputs to the VRU;

whereby recorded phrases are prepared by the VRU to announce to the subscriber a street segment having the congestion and an alternate route suggested for the congested street segment.

6. A network server method in the PSTN for performing a service of calling a subscriber if the subscriber's customary commuting route is congested, comprising:

running a traffic watching daemon that collects congestion measurements for respective segments of highways in the region and stores in each highway record of a database, a congestion metric for the geographic coordinates of each segment of the respective highway;

running a clock watching daemon that searches all subscriber records for matches of the time-of-day with customary times of commutes and selecting those subscriber records having a current match;

running a call-decision process that analyzes each selected subscriber record identified by the clock watching daemon, including an algorithm for advising the subscriber of routes that avoid tolls according to the subscriber's preference;

running a subscriber calling process that accesses the first database of subscriber records to obtain the subscriber's telephone number which it outputs to a VRU;

whereby recorded phrases are prepared by the VRU to announce to the subscriber the street segment having congestion and an alternate route suggested for the congested street segment.

7. A network server method in the PSTN for performing a service of calling a subscriber if the subscriber's customary commuting route is congested, comprising:

collecting congestion measurements for respective segments of highways in the region and storing in each highway record of a database, a congestion metric for the geographic coordinates of each segment of the respective highway;

searching all subscriber records for matches of the time-of-day with a customary commuting time and selecting those subscriber records having a current match;

analyzing each selected subscriber record identified, including an algorithm for advising the subscriber of routes that avoid tolls according to the subscriber's preference;

accessing the first database of subscriber records to obtain the subscriber's telephone number which is output to a VRU;

whereby recorded phrases are prepared by the VRU to announce to the subscriber the street segment having congestion and an alternate route suggested for the congested street segment.

8. A network server method in the PSTN for performing a service of calling a subscriber if the subscriber's customary commuting route is congested, comprising:

running a traffic watching daemon that collects congestion measurements for respective segments of highways in the region and stores in each highway record of a database, a congestion metric for the geographic coordinates of each segment of the respective highway;

running a clock watching daemon that searches all subscriber records for matches of the time-of-day with a customary time and selects those subscriber records having a current match;

running a call-decision process that analyzes each selected subscriber record identified by the clock watching daemon, including an algorithm for advising the subscriber of routes that avoid tolls according to the subscriber's preference;

said call-decision daemon using of "toll-adjusted travel times", wherein each time a toll road is encountered in a path, the daemon adds an additional amount of time to the computed travel time to obtain the toll-adjusted travel time, the additional amount being the toll paid on the route multiplied by a value specified by the subscriber;

running a subscriber calling process that accesses the first database of subscriber records to obtain the subscriber's telephone number which outputs to a VRU;

whereby recorded phases are concatenated by VRU to announce to the subscriber the street segment having congestion and an alternative route suggested for the congested street segment.

9. The network server method of claim 8, wherein the subscriber calls the server using a cellular phone while driving, thereby eliminating the need for the subscriber to interact with the service before each commute in order to set up traffic monitoring.

10. The network server method of claim 8, wherein the server uses position estimation to determine the vehicle's current location using the subscriber's starting time and the server's estimates of traffic conditions.

11. The network server method of claim 8, wherein the server remembers routes commonly used by a subscriber when he calls in to the server to set up traffic monitoring, thereby simplifying the interactions by requiring a choice of among only a few routes the subscriber commonly uses instead of all possible routes.

12. A network server method in the PSTN for performing a service of calling a subscriber if the subscriber's customary commuting route is congested, comprising:

collecting congestion measurements for respective segments of highways in a region and storing in a highway record, a congestion metric for the geographic coordinates of each segment of the respective highway;

searching subscriber records for matches of the time-of-day with a customary commuting time in the respective record, and selecting those subscriber records having a current match;

determining that traffic congestion exists along a commuting path customarily used by a subscriber identified in said searching;

determining the identified subscriber's present location along said commuting path;

determining whether the identified subscriber has passed said traffic congestion;

accessing the identified subscriber's records to obtain the subscriber's mobile telephone number;

calling the identified subscriber's mobile telephone and announcing the highway segment having congestion and announcing alternate routes for the congested segment.

13. The network server method of claim 12, which further comprises:

following an initial call to the subscriber, the network server continuing to search for better alternate routes having the least congestion and calling the subscriber again if a better alternate route is found.

14. The network server method of claim 13, which further comprises:

an algorithm to advise the subscriber of routes that avoid tolls according to the subscriber's preference by storing in the platform the subscriber's specification of the way the subscriber usually chooses his routes to avoid or accept tolls;

the algorithm simulating the subscriber's choices of routes according to the specification;

the algorithm relating a number of minutes required to detour a toll route, with a value in dollars of that lost time to the subscriber.

15. A network server method in the PSTN for performing a service of calling a subscriber if the subscriber's customary commuting route is congested, comprising:

collecting congestion measurements for respective segments of highways in a region and storing in a highway record, a congestion metric for the geographic coordinates of each segment of the respective highway;

searching subscriber records for matches of the time-of-day with a customary commuting time in the respective record, and selecting those subscriber records having a current match;

determining that traffic congestion exists along a commuting path customarily used by a subscriber identified in said searching, including an algorithm to advise the subscriber of routes that avoid tolls according to the subscriber's preference by storing in the platform the subscriber's specification of the way the subscriber usually chooses his routes to avoid or accept tolls, the algorithm simulating the subscriber's choices of routes according to the specification, the algorithm relating a number of minutes required to detour a toll route, with a value in dollars of that lost time to the subscriber;

determining the identified subscriber's present location along said commuting path;

determining whether the identified subscriber has passed said traffic congestion;

accessing the identified subscriber's records to obtain the subscriber's mobile telephone number;

calling the identified subscriber's mobile telephone and announcing the highway segment having congestion and announcing alternate routes for the congested segment.

16. A method of doing business in a telecommunications network of calling a subscriber if the subscriber's scheduled travel route is congested, comprising:

collecting congestion measurements in a telecommunications network for respective segments of roadways in a region;

analyzing scheduled travel of a subscriber over said roadway segments for a congestion condition and identifying an alternate route that has an acceptable level of congestion; and calling the subscriber and announcing the roadway segment having the congestion condition and the alternate route which has been found.

17. The method of doing business of claim 16, which further comprises:

following an initial call to the subscriber, continuing to search for better alternate routes having less congestion and calling the subscriber again if a better alternate route is found.

18. A network platform server in a network for calling a subscriber if the subscriber's customary commuting route is congested, comprising:

a storage in the platform, storing subscriber records organized by scheduled commuting time of a subscriber and highway records organized by street location;

a data processor in the platform, storing in each highway record, a congestion metric for segments of respective highways;

said data processor matching time-of-day with scheduled commuting time in the respective record and selecting those subscriber records having a match;

said data processor determining whether a subscriber's customary commuting route is congested;

said data processor searching for an alternate route near to a subscriber's customary route, the alternate route having an acceptable level of congestion;

a voice response unit coupled to said data processor to announce a congestion condition and an alternate route to a subscriber in response to determining that a subscriber's customary commuting route is congested.

19. A network platform method in a network for calling a subscriber if the subscriber's customary commuting route is congested, comprising:

storing subscriber records organized by scheduled commuting time of a subscriber and highway records organized by street location;

storing in each highway record, a congestion metric for segments of respective highways;

matching time-of-day with scheduled commuting time in the respective record and selecting those subscriber records having a match;

determining whether a subscriber's customary commuting route is congested;

searching for an alternate route near to a subscriber's customary route, the alternate route having an acceptable level of congestion; and announcing a congestion condition and an alternate route to a subscriber in response to determining that a subscriber's customary commuting route is congested.

* * * * *